May 24, 1966    A. W. HAYDON ET AL    3,253,169
SYNCHRONOUS MOTORS

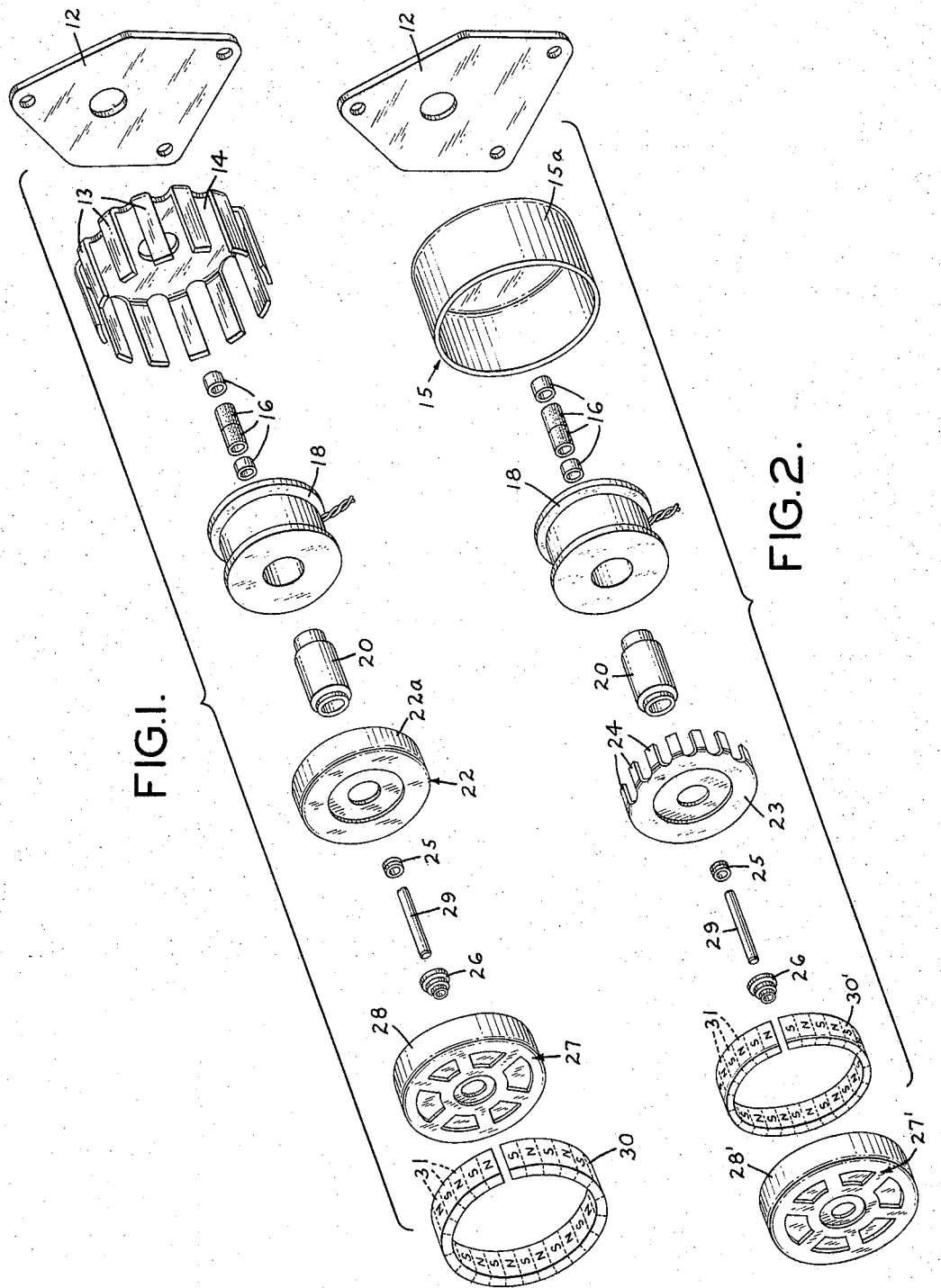

Filed Feb. 20, 1963    2 Sheets-Sheet 2

United States Patent Office 3,253,169
Patented May 24, 1966

3,253,169
SYNCHRONOUS MOTORS
Arthur W. Haydon, Milford, and Charles S. Daniels, Woodbury, Conn., assignors to Consolidated Electronics Industries Corp., Waterbury, Conn., a corporation of Delaware
Filed Feb. 20, 1963, Ser. No. 259,880
14 Claims. (Cl. 310—156)

The present invention relates to alternating-current synchronous motors and, more particularly, relates to improvements in self-starting, bidirectional synchronous motors of the type having but a single set of salient stator poles.

In Everard et al. Patent 3,059,131, issued October 16, 1962, and assigned to the assignee of the present application, there is described a novel type of A.C. synchronous motor having but a single set of salient stator poles, with all the poles in the set having the same instantaneous magnetic polarity. In illustrative embodiments of the motor shown in this patent the single set of salient stator poles are carried on a stator piece located inside a field coil which provides energizing flux for the motor. The pole members themselves are equiangularly spaced around a cylindrical rotor member of ferrite material which is magnetized in localized regions so as to provide pairs of non-salient magentic poles uniformly spaced about the axis of rotation, with adjacent poles being of opposite magnetic polarity. The rotor, the stator piece, and the encircling field coil are all contained within a housing of ferromagnetic material comprised of a cup-shaped cover piece secured to a mounting plate.

The motors described in the aforesaid patent were a revolutionary change and reduction in number of essential parts over prior art motor designs which heretofore had required two or more sets of stator poles of instantaneously opposite magnetic polarity. In addition, the motor embodiments described in this patent possess, without the use of shading poles, mechanical devices or the like, a reliable self-starting characteristic by reason of the fact that the rotor, upon de-energization of the motor, consistently assumed a predetermined quiescent (i.e., stopping) position relative to the stator pole members which produced maximum starting torque when the motor was again energized.

By reason of their simplicity of construction, their self-starting characteristics, and other advantageous features, the novel motors described in the aforesaid Everard et al. patent represent a marked advance in the art. However, in practice certain disadvantages have been experienced with some of the motor embodiments described in the patent because of the rather sizeable air gaps present between the stator poles, the rotors, and the cover plate. More importantly, the existence of a low reluctance magnetic circuit path provided outside the field coil by the ferromagnetic motor housing diverts a substantial portion of the stator flux and prevents it from coupling with the rotor poles, thus resulting in substantial power dissipation and a concomitant decrease in motor efficiency. Furthermore, the location of the stator pole members inside the field coil requires, by necessity, that the diameter of the rotor member, which determines the torque-moment of the motor, must be substantially less than the diameter of the field coil which encircles it. Accordingly, only a fraction (typically ½ or less) of the dimension of the motor in the direction transverse to its rotational axis is utilized as a moment arm for generating torque in these motors.

The present invention is directed to A.C. self-starting synchronous motors, of the type having but a single set of stator poles, which have significantly improved performance characteristics and other important advantages over the motor embodiments exemplified in the aforesaid Everard et al. Patent 3,059,131. In particular, due to improvements in the magnetic circuit provided for the stator flux and in the rotor design, motor embodiments of the present invention have substantially improved efficiency, power, and torque characteristics. Upon comparison with prior art motors of the Everard et al. type and of the same size and weight, it has been found by extensive tests that motor embodiments of the present invention can operate at up to four times the efficiency, and generate up to four times the running torque, of the former.

In addition, as the motor housing has no functional role in the magnetic circuit of the motors of the present invention, fewer and less costly parts are required in the construction as the cover piece of the housing may, if desired, be eliminated, and the mounting plate need not be made of ferromagnetic material.

The significant improvement in performance characteristics of motors of the present invention are obtained primarily because (1) substantially all the magnetic flux generated by the field coil is tightly confined, with very low leakage, to a single, low reluctance magnetic circuit path passing through the rotor and outside the field coil, and (2) the improved lightweight rotor design has a diameter approximately twice that of the prior art Everard et al. motors and utilizes only a small amount of magnetizable material in the form of a thin annular ring around the periphery of the rotor. The magnetizable ring portion of the rotor, in a preferred embodiment, comprises a flexible strip of rubber or plastic-bonded anisotropic barium ferrite material.

Besides possessing improved performance characteristics, as well as cost and weight savings in construction, the motor embodiments of the present invention produce good starting torque and retain the reliable self-starting action of the motor devices described in the Everard et al. patent, as the rotor element of these motors will consistently assume a quiescent position which bridges the space midway between adjacent stator pole members.

It is therefore a principal objective of the present invention to provide an improved design for a self-starting bidirectional synchronous motor, of the type containing but a single set of salient stator poles, which possesses substantially higher efficiency, as well as greater starting and running torque for a given size and weight, than synchronous motors of this type heretofore proposed.

It is another objective of the present invention to provide an improved design for the magnetic circuit of a self-starting bidirectional synchronous motor, of the type containing but a single set of salient stator poles, which has substantially less leakage flux than synchronous motors of this type heretofore proposed.

It is a further objective of the present invention to provide an improved self-starting bidirectional synchronous motor, of the type having but a single set of salient stator poles, which has fewer number of parts and is of uncomplex and economical design.

And it is yet another objective of the present invention to provide an improved permanent-magnet rotor of lightweight and economical design for a high torque A.C. synchronous motor which, by the nature of its construction, has a high energy product/mass ratio and requires only a small amount of magnetic material.

The foregoing and other objects, features, and advantages of the invention will be apparent from the following more particular description of preferred embodiments of the invention, as illustrated in the accompanying drawings.

FIG. 1 is an exploded, perspective view of one motor embodiment of the present invention.

FIG. 2 is an exploded, perspective view of an alternative motor embodiment of the present invention.

Figure 3:
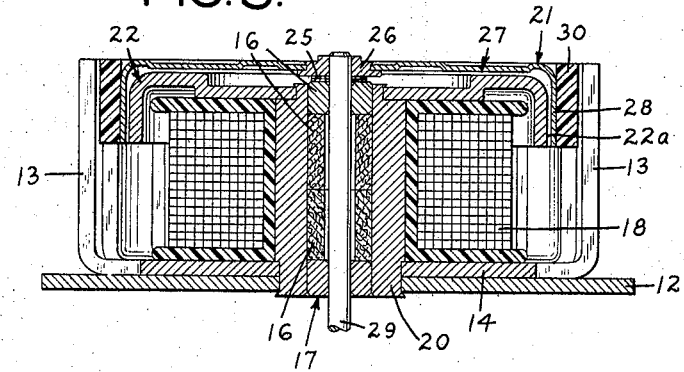
FIG. 3 is a cross-sectional view of the assembled motor embodiment of FIG. 1.

One embodiment of the invention is shown in FIGS. 1 and 3 of the drawings. In this form the major elements of the motor comprise a mounting plate 12, a stator polar structure 14, a field coil 18, a cup member 22, and a permanent-magnet rotor 21 formed of a supporting wafer element 27 and a peripheral ring 30 of magnetizable material. The mounting plate 12 is of conventional form and may be composed of any suitable material of requisite strength, such as aluminum or steel, for example. The stator member 14 is of ferromagnetic material, such as iron, and comprises a circular base from which projects a set of, exemplarily, twelve salient members or poles 13. These pole members 13 are arranged on a substantially cylindrical surface at uniform, angularly-spaced positions about the periphery of the stator piece 14. Both the base of the stator member 14 and the mounting plate 12 have center apertures therein adapted to receive and engage an end of a core piece 20 which contains a bearing assembly 17 for supporting the rotor 21.

Located inside of and mounted above the base of the stator piece 14 is a field coil 18 of conventional design wound on a circular bobbin form for providing energizing flux for the motor. Placed against the other end of the field coil 18 is a cup-like member 22 of ferromagnetic material which has a central opening adapted to secure the other end of the core 20 of the bearing assembly 17. The cup member 22 has a peripheral flange portion 22a which extends outside of and around the field coil 18 for a portion of the axial length of the latter. In the embodiments shown in FIGS. 1 and 3 the cup member 22 has a lesser diameter than the stator piece 14, and accordingly, the flange 22a is overlapped by the salient pole members 13 of the stator piece, thus forming an annular air gap therebetween.

Mounted above the cup-member 22 and secured to the shaft 29, which is supported for rotation in the core of the bearing assembly 17 (which, e.g., may conventionally include a pair of sintered bronze bearings and a lubricating wick 16 carried inside) is the permanent-magnet rotor element 21. If desired, a pair of thrust washers 25 may be interposed between the rotor 21 and the face of the bearing assembly 17. The rotor is of circular configuration and comprises a peripheral ring member 30 secured by a suitable binder, such as cement or epoxy resin, to the turned lip portion 28 of a thin, supporting rotor framepiece 27 which is securely attached to the shaft 29 by means of hub piece 26. The rotor framepiece element 27 is made of a ferrous material which serves to capture any stray leakage flux and direct it to the annular air gap formed between the flange 22a and the salient pole members 13. The framepiece can be considered magnetically as being part of the cup member 22.

The magnetizable ring 30 is preferably composed of a flexible strip of plastic or rubber-bonded anisotropic ferrite material having a plurality of permanently magnetized regions 31 of alternate polarity induced therein. One material found especially suitable in certain motor embodiments of the present invention is a rubber-bonded barium ferrite material having exceptionally good magnetic properties, including a high coercive force of approximately 1,300 oersteds and a maximum energy product of approximately $.9 \times 10^6$ gauss, as well as flexibility, machinability and other good mechanical qualities, and is commercially available, for example, under the name "Plastiform" from Leyman Corporation of Cincinnati, Ohio. This ferrite rotor material, being magnetically hard, enables the placing of poles of opposite polarity very close to each other on the periphery of the rotor to form a non-salient pole type rotor. The magnetic field intensity established by these poles does not deteriorate appreciably during operation or with age once the rotor is subjected to the alternating flux field of the stator at the lowest temperature at which it is anticipated the motor will be run.

Figure 5:
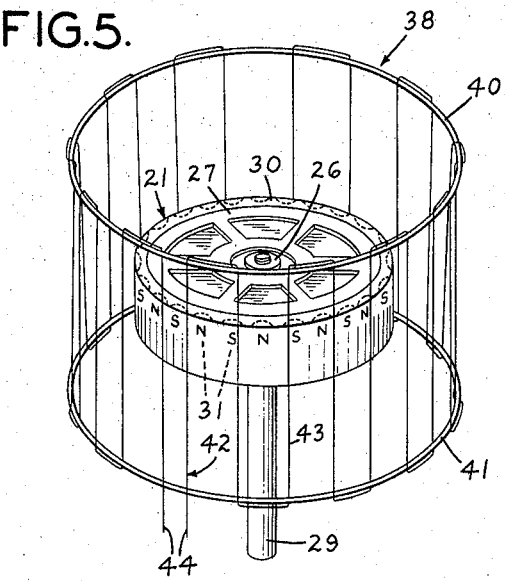
FIG. 5 is a perspective view of a jig means suitable for magnetizing the pole regions on the rotor element of the motor embodiments of the present invention.

One practical manner for inducing the magnetically-oriented regions 31 which constitute the poles of the rotor 21 is illustrated in FIG. 5. The assembled rotor 21, of the motor embodiment of FIGS. 1 and 3, for example, is placed within a drum-like magnetizing fixture, generally indicated at 38, consisting of a top ring 40 and a bottom ring 41, both of which are formed of insulating material and suitably supported in coaxial spaced relation as shown. Heavy conductive wire 42 is looped about the top and bottom rings a sufficient number of times so that there are as many individual spans 43 of wire between the rings as there are poles to be formed in the periphery of the rotor. For the twenty-four pole rotor shown in the embodiments of FIGS. 1 and 3 there would be twenty-four such spans. As shown, the loops of wire should be formed so that each span 43 of wire between the rings 40 and 41 is substantially parallel to the axis of the fixture 38 and all the spans are at equally spaced locations about the rings. The leads 44 are provided for connecting the wire which forms the loops to a suitable source of direct current capable of supplying relatively high current for short periods of time.

When current is passed through the wire forming the loops, strong magnetic fields will be set up around the individual spans 43 of wire and will cause that portion of the ferrite material 30 within the influence of the field to become magnetically aligned along the lines of force of the fields. Inasmuch as the current is oppositely directed in adjacent spans (i.e., if it is assumed that the current in one span is downward, the current in an adjacent span will be upward), the magnetic fields created by adjacent spans will be oppositely directed. Accordingly, the portions of the ferrite material 30 under the influence of these fields will be magnetically aligned in opposite directions thereby forming rotor poles 31 of opposite polarity on the periphery of the rotor 21 as indicated.

In some instances it may be desirable that the supporting rotor framepiece element 27 of the rotor 21 be comprised of non-magnetic material such as plastic rather than of a magnetically conductive material such as iron.

Referring again to FIG. 3, which shows the motor embodiment of FIG. 1 in assembled form, it can readily be seen that the stator flux generated by the field coil 18 follows a circuit path of extremely low reluctance. It is to be particularly noted, in comparison with the motor embodiments shown in the aforementioned Everard et al. patent, that the air gaps through which the magnetic flux passes between the rotary and stationary elements of the motor are of extremely small and narrow dimension. It is especially significant that there is only a single preferred path for stator magnetic flux (that is, starting from the base of the stator piece 14 as a point of departure, the flux travels in a path radially outward, then parallel to the axis of the motor and upward along the stator pole members 13, next transversely of the axis across the air gap to the rotor poles 31 on the peripheral ring member 30 of the rotor 21, continuing through the respective thicknesses of the rotor ring and the lip portion 28 of the supporting framepiece 27 across another air gap to the flange portion 22a of the cup member 22, thence radially inward through the cup member 22 towards the center of the field coil 18, and finally parallel to the axis of the field coil and downward through the ferrous core piece 20 to complete the circuit path). In contradistinction, in the motor embodiments shown in the patent, a diversionary path outside the field coil of low reluctance is presented to the stator flux via the ferromagnetic cover piece and mounting plate. The flux following such a path is not available for coupling with the rotor of the motor and constitutes leakage flux; accordingly, a significant portion of the stator flux is diverted and does not produce any useful work output.

It is to be further noted that, by reason of the nature of the construction of the motor embodiments of the present invention, the rotor member 21, being located outside of the field coil 18, has a radius, and hence a moment arm, which is just slightly less than the overall dimension of the motor transverse to its axis of rotation. In other words, the location of the air gap, in which the rotor 21 interacts with the magnetic field of the stator, outside the field coil 18 rather than inside, permits, per se, the rotor to generate a torque on the order of two or more times higher by reason of the increased length available in its moment arm.

In addition to the increase in performance characteristics produced by (1) the improved magnetic circuit, (2) the smaller air gap through which the stator flux traverses, and (3) the longer moment arm through which the force produced by the interaction of the stator and rotor magnetic fields acts, the motor embodiments of the present invention also possess substantial advantages over prior art devices in performance, as well as cost, because of the novel design provided for the rotor element 21. The combination of a thin peripheral ring 30 of magnetized material in conjunction with a lightweight supporting framepiece 27 of non-critical material yields a rotary member possessed of a high energy product-to-mass ratio, and thus the resultant motor has exceptionally good starting and running torque for its size and weight.

Figure 4:
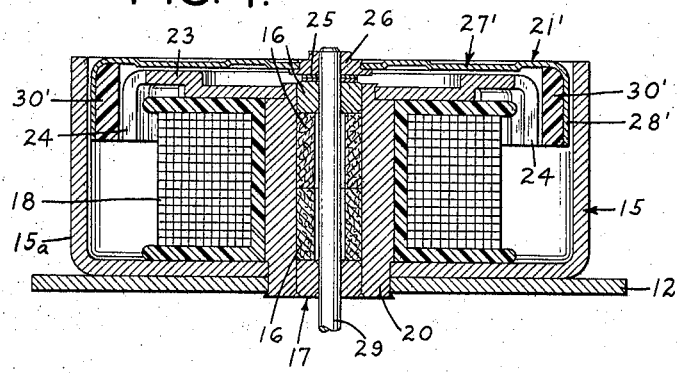
FIG. 4 is a cross-sectional view of the assembled motor embodiment of FIG. 2.

FIGS. 2 and 4 show an alternative embodiment of the present invention which possesses substantially the same characteristics as the motor embodiment shown in FIGS. 1 and 3. (In these figures, elements of the motor which are identical to those shown in the motor embodiment of FIGS. 1 and 3 are identified with the same reference characters; while those elements which differ only in dimension from similar elements shown in the previously-described embodiment are distinguished by prime superscripts, and elements which are substantially different are identified with new reference characters.)

Basically, the major difference between the two embodiments is that, in the latter, the stator pole piece and the ferromagnetic cup member have changed places in the motor. As may be seen in the figures, the principal elements of this embodiment of the motor comprise the mounting plate 12, a ferromagnetic cup member 15 having a peripheral flange portion 15a, the field coil 18, a stator polar structure 23 having a plurality of salient pole members 24 projecting from its periphery, and a permanent magnet rotor 21'. It will be observed that, in this particular embodiment, it is the flange portion 15a of the cup member 15 which overlaps the pole members 24 of the stator piece 23 rather than the other way around. Also, the magnetized peripheral ring member 30' is attached around the inside of the lip portion 28' of the circular supporting framepiece 27' rather than around the outside. Other than these differences, the construction and operation of this motor embodiment are substantially identical to that of the previously-described embodiment.

Both of these motor embodiments possess the reliable self-starting characteristic common to motors of the type described in the Everard et al. patent. The construction of the stator, rotor, and the other magnetic circuit elements, their physical configuration, their magnetic properties (reluctance), and their mutual interrelationships aid in causing the rotor consistently to assume the preferred quiescent position described in the aforesaid patent, and to start reliably when the stator poles are energized.

In certain embodiments, the motor of the present invention will start and run either in a clockwise direction or in a counterclockwise direction, depending upon the exact moment when it is energized and hence upon the phase or polarity condition of the energizing current when the motor is energized. This bi-directional characteristic is satisfactory for a number of motor applications. However, if unidirectional operation of the motor is desired, any of several common mechanical "no-back" devices may be incorporated, or alternatively, various non-mechanical arrangements may be employed to assure unidirectional operation.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. In a synchronous A.C. motor, a stator piece having a set of salient stator poles, a field coil magnetically-coupled to said stator piece for producing an alternating magnetized flux field in the salient stator poles of said motor, said salient stator poles extending from an end of said coil longitudinally along the length of and outside the same, a magnetic circuit member of low reluctance connected to said field coil and having a portion outside of the coil juxtaposed near the ends of the poles of said stator piece with an air gap inbetween, said magnetic member having a substantially smoothly contoured portion in the region facing said salient stator poles, said coil being magnetically coupled to said stator piece and to said magnetic circuit member, whereby at any instant all of said stator poles are of one magnetic polarity and said smoothly contoured portion of said magnetic circuit member has the opposite magnetic polarity, and a permanent-magnet rotor having a plurality of poles of alternate polarity spaced around its periphery and mounted for rotation in the magnetic field provided in said air gap between said magnetic circuit member and said salient stator poles.

2. An A.C. synchronous motor having high efficiency and high torque characteristics comprising: a field coil for producing alternating magnetic flux; stator means of low reluctance magnetic material in magnetic circuit relation with said coil for guiding said flux; said stator means including a portion forming a magnetic path extending radially near an end of said coil and then longitudinally along said coil outside the same to form a smoothly contoured, or non-salient, periphery, and a plurality of salient pole members of the same instantaneous magnetic polarity extending from the other end of said coil longitudinally along said coil outside the same; the periphery of said stator portion and the ends of said salient pole members overlapping so as to leave an air gap inbetween; and a permanent-magnetic rotor having a plurality of poles of alternate polarity spaced around its periphery and mounted for rotation in the magnetic field provided in said air gap by said field coil and said stator means; said stator means and said rotor forming thereby a closed path of very low leakage for magnetic flux produced by said field coil during operation of said motor.

3. An A.C. synchronous motor having high efficiency and high torque characteristics comprising: a field coil wound in a cylindrical form around an axis for producing alternating magnetic flux; circularly symmetrical stator means of low reluctance magnetic material mounted concentrically with said coil and in magnetic circuit relation therewith for guiding said flux, said stator means including a cup-like portion forming a magnetic path extending radially outward near an end of said coil and then longitudinally along said coil outside the same to a smoothly contoured, or non-salient, edge region, and a plurality of spaced finger-like pole members of the same instantaneous magnetic polarity extending from the other end of said coil longitudinally along said coil outside the same; the edge region of said cup-like portion and the ends of said pole members overlapping so as to leave inbetween a narrow annular air gap concentric with said coil; and a permanent-magnetic disc-shaped rotor of larger diameter than said field coil having a plurality of poles of alternate polarity spaced around a peripheral ring formed of magnetizable ferrite material, said rotor being concentrically mounted for rotation in the magnetic field provided in said air gap by said field coil and said stator means, and said magnetic field being directed transverse to the axis of said field coil; said stator means, said air gap, and said rotor forming thereby a closed path outside said field coil of very low leakage for said alternating magnetic flux.

4. Motor apparatus according to claim 3 wherein the magnetic circuit paths for rotor flux, when said field coil is de-energized, are adapted to cause the quiescent rotor position to consistently be one in which said stator pole members lie substantially midway of the spacing between adjacent rotor poles of opposite polarity, thereby to provide said motor with a self-starting characteristic.

5. In a synchronous A.C. motor, a stator piece having a single set of substantially equally-spaced salient stator poles, a field coil magnetically-coupled to said stator piece for producing an alternating magnetized flux field of the same phase relationship in all the salient stator poles of said motor, said salient stator poles extending from an end of said coil longitudinally along the length of and outside the same, a cup-like ferromagnetic member attached to said field coil and having a flange element having an instantaneously oppositely magnetic polarity from the polarity extending from the other end of said coil longitudinally along the length of and outside the same, said flange having a smoothly contoured region not divided into salient poles, said region and the ends of the poles of said stator piece overlapping with an annular air gap inbetween, and a permanent-magnet rotor having a plurality of poles of alternate polarity spaced around its periphery and mounted for rotation in the magnetic field provided in said annular air gap between said ferromagnetic member and said salient stator poles.

6. A motor according to claim 5 in which said permanent-magnet rotor comprises a circular supporting element and a thin annular ring of magnetized anisotropic ferrite material in a suitable binder affixed to the periphery of said element.

7. The rotor of claim 5 characterized in that the magnetizable anisotropic ferrite material in a suitable binder is rubber-bonded barium ferrite material.

8. An A.C. synchronous motor having high efficiency and high torque characteristics comprising: a cylindrical field coil having two ends; a stator structure comprising a first low-reluctance portion at one end of said field coil and magnetically coupled therewith and extending radially outwardly to a peripheral edge, and a second low-reluctance magnetic portion at the other end of said field coil magnetically linked therewith and extending radially outward and axially along the outside of said coil toward said first portion and terminating in an edge lying in a cylinder adjacent to the peripheral edge of said first portion, one of said edges having salient poles formed therein to concentrate magnetic flux and the other of said edges having a smooth, or non-salient, contour radially spaced from said salient poles, said first and second portions of said stator structure being oppositely magnetically polarized when said coil is energized; and a rotor comprising a ring of permanent magnetic material between, and radially spaced from, both of said edges, said ring having a number of magnetic poles permanently magnetized therein and angularly spaced from each other by distances commensurate with the angular spacing between said salient stator poles, a radially extending rotor framepiece element having a periphery to which said permanent magnet rotor is attached, and a shaft supporting said framepiece element and extending axially with respect to said coil.

9. The rotor of claim 8 in which said permanent magnet material is a strip of resilient material comprising anisotropic ferrite material.

10. The motor of claim 8 in which said salient poles are formed in said edge of said second portion.

11. The motor of claim 8 in which said poles are formed in said peripheral edge.

12. The motor of claim 11 in which said peripheral edge extends axially with respect to said coil.

13. The motor of claim 8 in which there is an equal number of north and south poles in said magnetic material.

14. The motor of claim 13 in which the number of said salient stator poles is equal to the number of said north poles.

References Cited by the Examiner

UNITED STATES PATENTS

| | | | |
|---|---|---|---|
| 2,572,632 | 10/1951 | Kurz | 310—164 |
| 2,999,275 | 9/1961 | Blume | 18—55 |
| 3,059,131 | 10/1962 | Everard et al. | 310—164 |
| 3,122,666 | 2/1964 | Guiot | 310—41 |

ORIS L. RADER, *Primary Examiner.*

MILTON O. HIRSHFIELD, *Examiner.*